(12) United States Patent
Duzick

(10) Patent No.: US 7,165,762 B1
(45) Date of Patent: Jan. 23, 2007

(54) ELECTRONIC SOLDERING AID

(76) Inventor: Christopher B. Duzick, 2466 N. Buena Vista St., Burbank, CA (US) 91504-2617

( * ) Notice: Subject to any disclaimer, the term of this patent is extended or adjusted under 35 U.S.C. 154(b) by 113 days.

(21) Appl. No.: 10/971,864

(22) Filed: Oct. 21, 2004

(51) Int. Cl.
 *B25B 1/20* (2006.01)
(52) U.S. Cl. .............................. 269/45; 269/75; 269/97
(58) Field of Classification Search .................. 269/45, 269/75, 3, 6, 97; 248/104, 229.13, 229.23, 248/231.51; 24/300, 482, 495, 543
See application file for complete search history.

(56) References Cited

U.S. PATENT DOCUMENTS

| 2,110,037 A | 3/1938 | De Rosa |
| 2,324,803 A * | 7/1943 | Snyder ........................ 269/75 |
| 2,510,198 A | 6/1950 | Tesmer |
| 6,357,710 B1 | 3/2002 | Fielden et al. |

* cited by examiner

*Primary Examiner*—Robert C. Watson
(74) *Attorney, Agent, or Firm*—Wagner & Anderson; John E. Wagner

(57) ABSTRACT

An apparatus for holding and positioning a work piece in a desired position includes a hand-operated clamp for securing the apparatus to a fixed support, such as a table or workbench, a flexible, multi-segmented arm having one end secured to the hand-operated clamp and the opposite end pivotally secured to a vise. The vise includes a pair of jaws, a pair of essentially parallel tracks, and a screw mounted substantially parallel to said tracks. A small platform having resilient flanges snaps over and secures itself to the tracks. A number of configurations of the platform are possible depending upon the support structure of the electrical connectors or other assemblies which are being soldered or assembled. Work pieces of various shapes and sizes may be secured either to the platform or by the jaws of the vise.

11 Claims, 3 Drawing Sheets

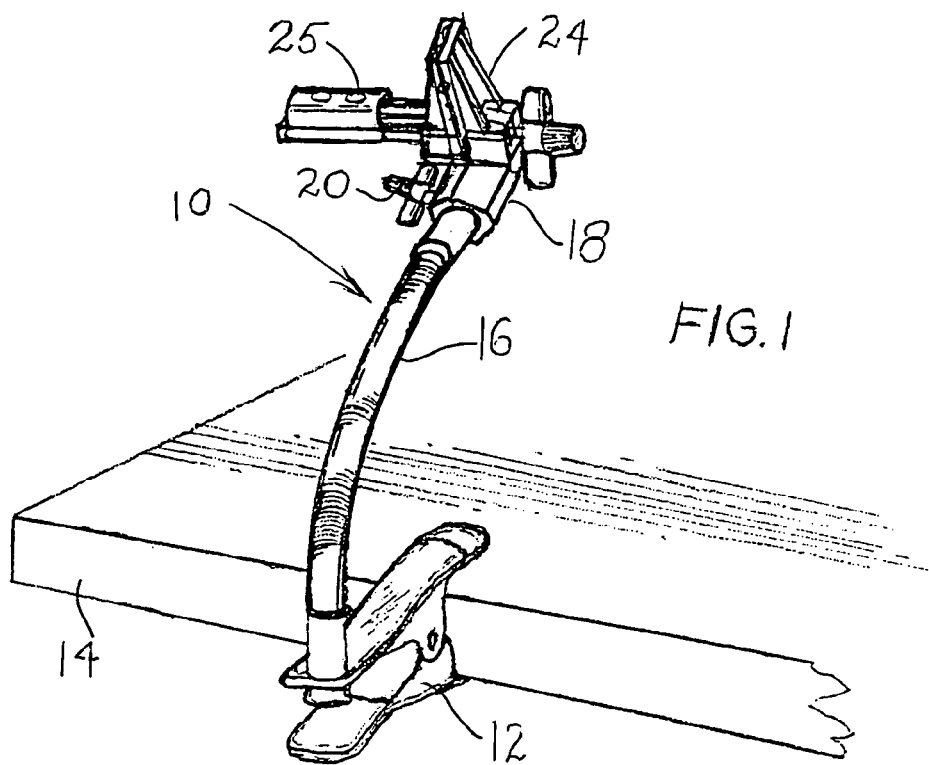
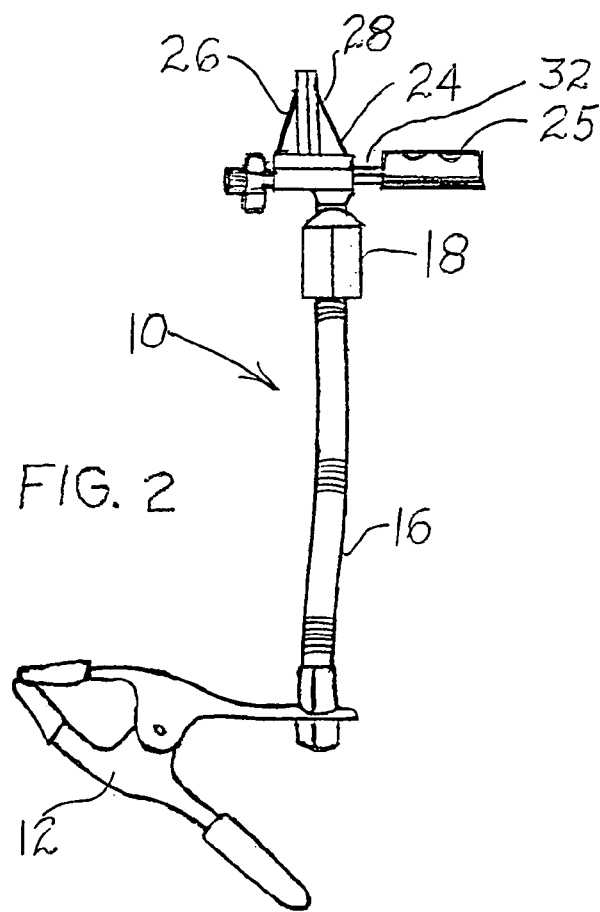
FIG. 1
FIG. 2

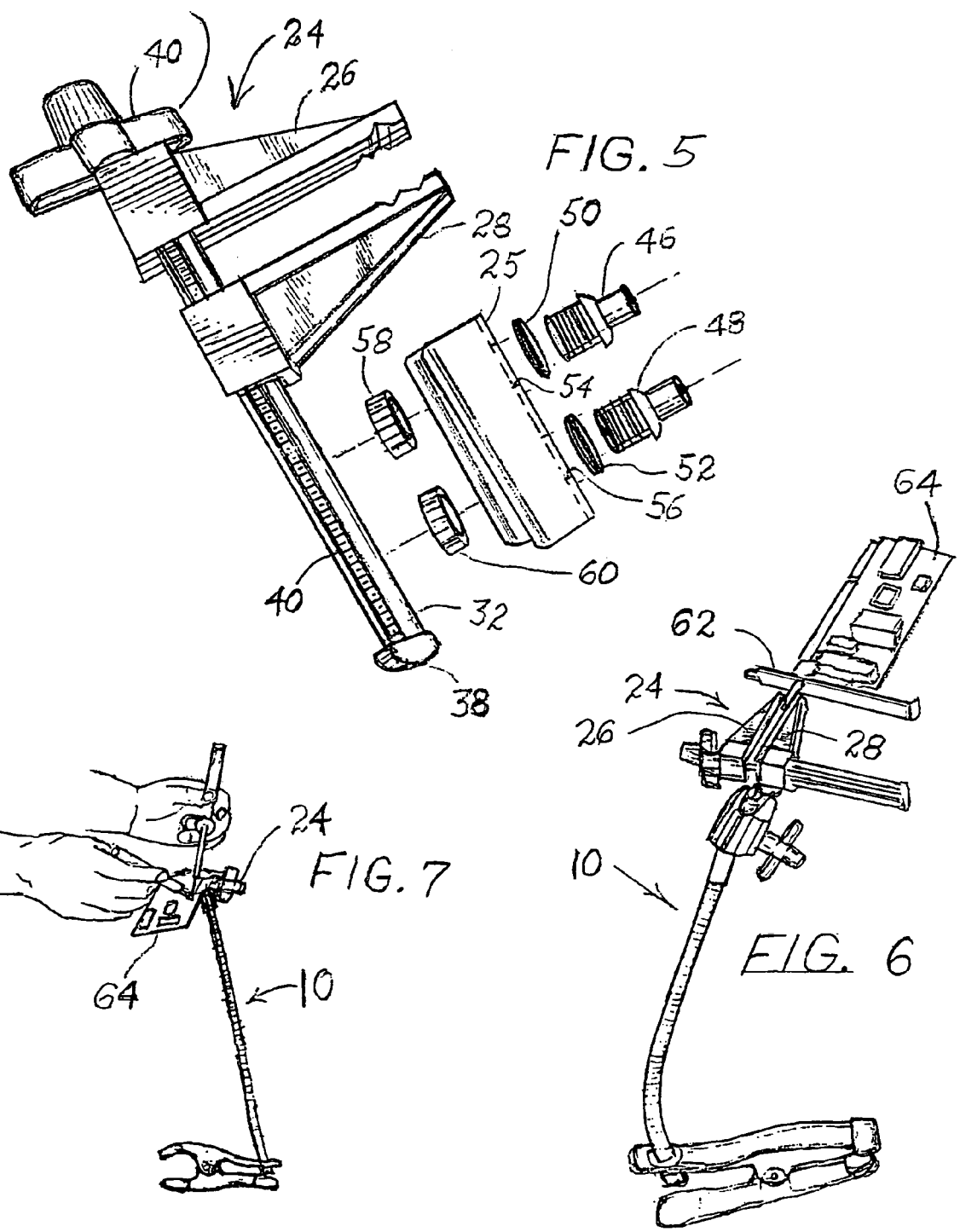

ELECTRONIC SOLDERING AID

BACKGROUND OF THE INVENTION

There are many applications in the electronic products industry, such as video communication services, as well as in other occupations, where it is desired to perform an assembly operation, a soldering operation, or similar work in a location or position in which it is not convenient or comfortable to perform such operations because of a lack of suitable means to position a work piece where desired. A number of clamp devices have been devised to aid in such positioning of such work pieces.

U.S. Pat. No. 2,510,198 teaches a segmented cable with a C-clamp at each end and an internal cable, which can be shortened to tighten the segmented cable sections to hold the cable in any desired position.

U.S. Pat. No. 2,110,037 teaches a segmented cable with a suitable clamp at one end for holding a baby's bottle and a C-clamp at the opposite end for clamping the cable to a rail of the baby's bed.

U.S. Pat. No. 6,357,710 discloses a segmented cable with a manually operated spring clamp at one end and a similar clamp at the other end. One such clamp is for gripping a suitable support and the other clamp is for supporting an item, such as an umbrella, flashlight, work piece, etc., in a desired position.

Despite the above and other clamp devices which have been made, there remains a need for a clamp device providing a convenient, satisfactory support for small scale, fine detailed work, such as soldering leads to electrical connectors.

SUMMARY OF THE INVENTION

A device for supporting small work pieces, such as electrical connectors or printed circuit boards, consists of a flexible, multi-segmented cable having a manually-operated clamp at one end, which is used to secure the device to a fixed location such as an edge of a table or in other situations where a vise is needed and a conventional vise cannot be placed in an area suitable to perform the work, i.e., equipment racks, ceilings, floors, or mobile installations and having a vise at the opposite end. The vise is preferably pivotally mounted to provide substantial flexibility in positioning a work piece.

The vise includes a pair of jaws which are movable relative to each other by means of a screw and a pair of tracks paralleling the screw which are of somewhat greater than usual length. The additional length of the tracks, which extend beyond the usual open position of both jaws of the vice, provides a means for support of a platform that is secured to the tracks and which includes fixtures for carrying work pieces.

The tracks constitute a pair of parallel tubular members and the platform may include depending flanges of partially arcuate cross section which deflect and snap over the tracks to secure the platform to the tracks. The platform may have mounting holes, sockets, or projections which are mated with the type of electrical connector or other work piece which the operator wishes to have the work piece rigidly supported in order to solder, assemble or otherwise process.

In case the operation is to attach a connector to a cable end, it is particularly awkward to assemble the connector and the cable conductors unless both are securely held in place during assembly and soldering operations.

BRIEF DESCRIPTION OF THE DRAWINGS

This invention may be more clearly understood with the following detailed description and by reference to the drawings in which:

FIG. 1 is a perspective view of a clamp assembly according to the invention;

FIG. 2 is a side elevational view of the clamp assembly of FIG. 1;

FIG. 5 is a side exploded view showing the vise portion of the clamp assembly with the platform and electrical connectors exploded from the vise;

FIG. 6 is a perspective view of a clamp assembly according to the present invention showing an alternate application of the vise; and FIG. 7 is a view of the assembly of FIG. 7 showing an individual making a soldered connection with the aid of the clamp assembly.

DETAILED DESCRIPTION OF THE PREFERRED EMBODIMENT

Figure 3:
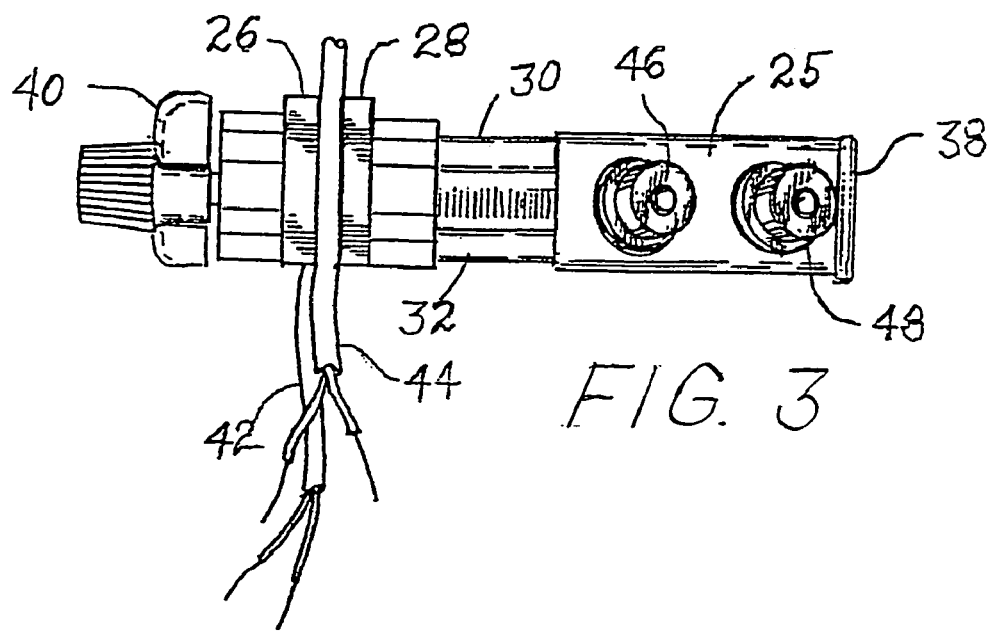
FIG. 3 is a top plan view of the vise portion of the clamp assembly of the invention with connector parts in place.

FIG. 1 is a perspective view of a clamp assembly 10, including a hand-operated clamp 12 which is spring loaded to attach to an edge of a table or workbench 14. Attached to clamp 12 is a multi-segmented cable 16 which has, at its opposite end, a pivot structure 18. Pivot structure 18 includes a hand-operated handle 20 that is rotatable to tighten or loosen pivot structure 18 to increase or decrease the pressure holding a substantially spherical member (not shown in this view) forming part of a vise 24. By loosening handle 20, the vise 24 can be rotated 360° and also tilted up or down as desired within a volume slightly greater than ½ sphere. Carried on vise assembly 24 is a platform 25, discussed below.

Figure 4:
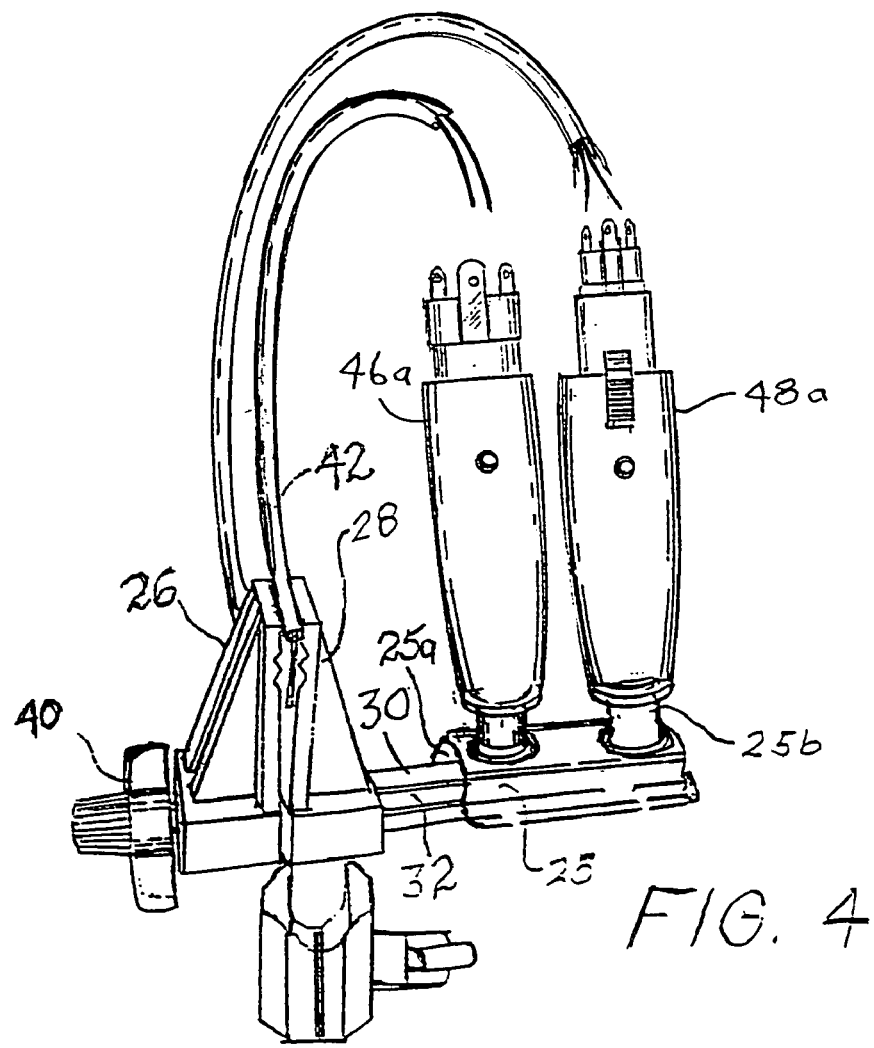
FIG. 4 is a perspective view of the vise portion of the clamp assembly of the invention including a platform carrying electrical connectors constituting work pieces.

FIG. 2 is a side elevational view of the clamp assembly 10, including clamp 12, the multi-segmented cable 16, pivot structure 18, vise 24, and platform 25. Vise 24 includes a pair of jaws 26 and 28 of which jaw 28 is extended to include the spherical member in pivot structure 18. Jaw 26 includes a pair of track members 30 and 32 (of which only track 32 is visible in this view), which pass through passages in jaw 28 and which extend beyond the normal position of jaw 28 and are maintained parallel to each other by means of a spacer 38 (see FIG. 3), which preferably includes a socket receiving the outer end of screw 40. Hand-operated screw 40 opens and closes jaws 26 and 28 which are shown in FIGS. 3 and 4 carrying a pair of insulated wires 42, 44. Platform 25 includes downwardly depending flanges 25a and 25b (FIG. 4), which snap over track members 30 and 32 to hold platform 25 in place.

Shown carried on platform 25 are RCA-type female chassis mount connectors 46 and 48 attached to the platform 25 of FIG. 3. This allows a variety of interchangeable connectors (46a and 48a of FIG. 4) to plug on to adapters 46 and 48 of a variety of types and act as holding devices while soldering wires onto the exposed pins of connectors 46a and 48a. This increases productivity by eliminating steps in the soldering procedure, i.e., opening and closing the vise and, more importantly, holds each connector rigidly in position for soldering, while the vice can hold the mating cables with a few inches of free length.

FIG. 5 is a side view of the vise 24 with platform 25 and RCA-type connectors 46 and 48 exploded from the vise and from platform 25. Connectors 46 and 48 have threaded ends which are inserted through washers 50, 52 into ports 54, 56 in platform 25 and are secured in place by means of nuts 58, 60.

From the foregoing, it will be recognized that many types of connectors can be secured to platform 25 positioned as desired with clamp assembly 10 and soldered or otherwise processed as described.

FIG. 6 is a perspective view of clamp assembly 10 showing an alternate application of vise 24. In this view, vise 24 does not carry platform 25 but instead holds a fixture 62 between jaws 26 and 28. Secured to fixture 62 is a printed circuit board 64 carrying a plurality of components.

In FIG. 7, the clamp assembly 10 of FIG. 6 is shown holding circuit board 64 in a position convenient for an individual to make a solder connection on circuit board 64.

The above-described embodiments of the present invention are merely descriptive of its principles and are not to be considered limiting. The scope of the present invention instead shall be determined from the scope of the following claims including their equivalents.

I claim:

1. Apparatus for holding and positioning a work piece in a desired position relative to a fixed support for soldering or other assembly operation comprising:
   a manually operable clamp for securing said apparatus to said fixed support;
   a flexible, multi-segmented arm having two ends, one end being secured to said clamp; and
   a vise secured to the second end of said arm;
   wherein said vise includes two elongated track members and an elongated screw and spacer at the end of said screw and said track members for holding said screw and said track members in alignment.

2. Apparatus in accordance with claim 1 comprising a platform securable to said track members and including work piece attachment means.

3. Apparatus as claimed in claim 1 wherein said platform includes a substantially flat work piece supporting area and two downwardly depending flanges dimensioned to snap over and secure said platform to said track members.

4. Apparatus as claimed in claim 2 wherein said platform for supporting said work piece includes a substantially flat work pieces supporting area and two downwardly depending flanges dimensioned to snap over and secure said platform to said track members.

5. Apparatus as claimed in claim 4 further comprising interchangeable means for securing a work piece to said platform.

6. Apparatus for holding and positioning a workpiece in a desired position relative to a fixed support for soldering or other assembly operation comprising:
   a manually operated clamp for securing said apparatus to said fixed support;
   a flexible multi-segmented arm having two ends, one end being secured to said manually operated clamp;
   a vise secured to the opposite end of said arm, said vise including a pair of jaws;
   a pair of track members secured to one of said jaws and extending through the other of said jaws; and
   means supporting said work piece on said vise.

7. Apparatus as claimed in claim 6 wherein said means supporting said work piece includes a platform and downwardly depending flanges dimensioned to snap over and secure said platform to said track members.

8. Apparatus as claimed in claim 7 wherein said vise includes a spacer at the outboard end of said track members for holding said track members in alignment.

9. Apparatus as claimed in claim 7 wherein said platform includes means for attaching a variety of connector parts to be used for holding mating connector parts rigidly for soldering or other assembly operation.

10. Apparatus as claimed in claim 6 wherein said vise is pivotally secured to said arm permitting said vise to rotate 360 degrees relative to said arm.

11. Apparatus as claimed in claim 10 wherein said vise is movable over a volume exceeding one half sphere.

* * * * *